(12) United States Patent
Kobayashi et al.

(10) Patent No.: US 9,330,650 B2
(45) Date of Patent: May 3, 2016

(54) SOUND MASKING DEVICE AND SOUND MASKING METHOD

(75) Inventors: Eiko Kobayashi, Hamamatsu (JP); Toshiaki Ishibashi, Fukuroi (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 356 days.

(21) Appl. No.: 13/821,738

(22) PCT Filed: Sep. 8, 2011

(86) PCT No.: PCT/JP2011/070497
§ 371 (c)(1),
(2), (4) Date: Mar. 8, 2013

(87) PCT Pub. No.: WO2012/033165
PCT Pub. Date: Mar. 15, 2012

(65) Prior Publication Data
US 2013/0163772 A1    Jun. 27, 2013

(30) Foreign Application Priority Data

Sep. 8, 2010    (JP) .................................. 2010-200468
Mar. 16, 2011    (JP) .................................. 2011-057384

(51) Int. Cl.
*G10K 11/00*    (2006.01)
*G10K 11/175*    (2006.01)
(Continued)

(52) U.S. Cl.
CPC ............ *G10K 11/002* (2013.01); *G10K 11/175* (2013.01); *H04K 3/43* (2013.01);
(Continued)

(58) Field of Classification Search
CPC ..... H04R 3/002; G10K 11/178; G10K 11/175

USPC ............................................... 381/71.1–71.14
See application file for complete search history.

(56) References Cited

U.S. PATENT DOCUMENTS

2004/0125922 A1*    7/2004    Specht ........................ 379/88.01
2006/0109983 A1*    5/2006    Young et al. .................. 380/252
(Continued)

FOREIGN PATENT DOCUMENTS

JP    05-022391 A    1/1993
JP    2005-084645 A    3/2005
(Continued)

OTHER PUBLICATIONS

International Searching Authority Report and International Search Report for PCT/JP2011/070497. Dated Sep. 8, 2010.
(Continued)

*Primary Examiner* — Rasha Al Aubaidi
(74) *Attorney, Agent, or Firm* — Rossi, Kimms & McDowell LLP

(57) ABSTRACT

A sound masking device includes: a sound pick-up unit which picks up a sound, and which produces a picked-up sound signal based on the sound, a masking sound signal producing unit which produces a masking sound signal from the picked-up sound signal a sound emitting unit which emits a masking sound based on the masking sound signal, and an echo cancelling unit which performs an echo cancelling process on the picked-up sound signal by performing an adaptive filtering process on the masking sound signal, and by subtracting the filtered masking sound signal from the picked-up sound signal. The masking sound signal producing unit produces a masking sound signal having a level corresponding to an amplitude level of the picked-up sound signal which has subjected to the echo cancelling process.

13 Claims, 7 Drawing Sheets

(51) Int. Cl.
    *H04R 3/02*     (2006.01)
    *H04M 9/08*     (2006.01)
    *H04K 3/00*     (2006.01)

(52) U.S. Cl.
    CPC ............ *H04K 3/45* (2013.01); *H04K 3/825* (2013.01); *H04M 9/082* (2013.01); *H04R 3/02* (2013.01); *H04K 3/42* (2013.01); *H04K 2203/12* (2013.01)

(56) References Cited

U.S. PATENT DOCUMENTS

2009/0097671 A1* 4/2009 Paradiso et al. ............ 381/73.1
2009/0164212 A1   6/2009 Chan et al.

FOREIGN PATENT DOCUMENTS

| | | |
|---|---|---|
| JP | 2006-217542 A | 8/2006 |
| JP | 2006-261967 A | 9/2006 |
| JP | 2007-235864 A | 9/2007 |
| JP | 2009-118062 A | 5/2009 |

OTHER PUBLICATIONS

Notification of Reason for Refusal issued in Japanese Patent Application No. 2011-057384 issued on Aug. 26, 2014, English translation provided.

Chinese Office Action cited in Chinese counterpart application No. CN201180043378.4, dated Feb. 28, 2014. English translation provided.

* cited by examiner (FIG. 2 CONTINUED)
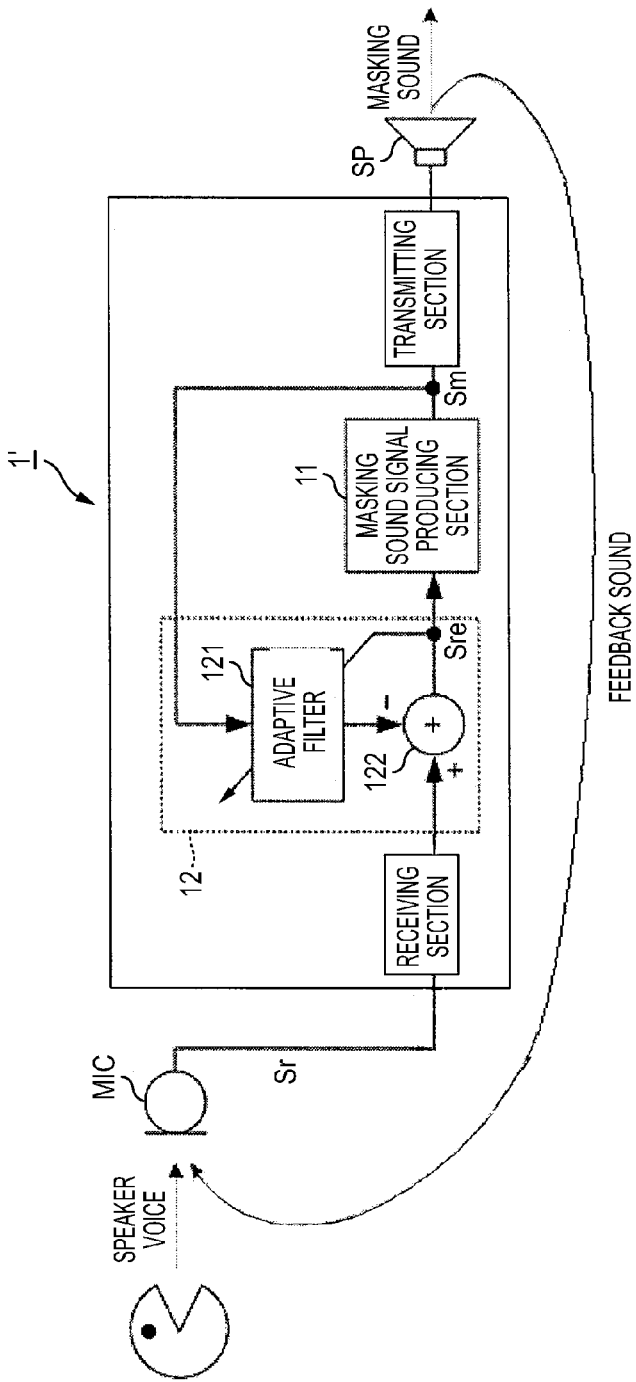

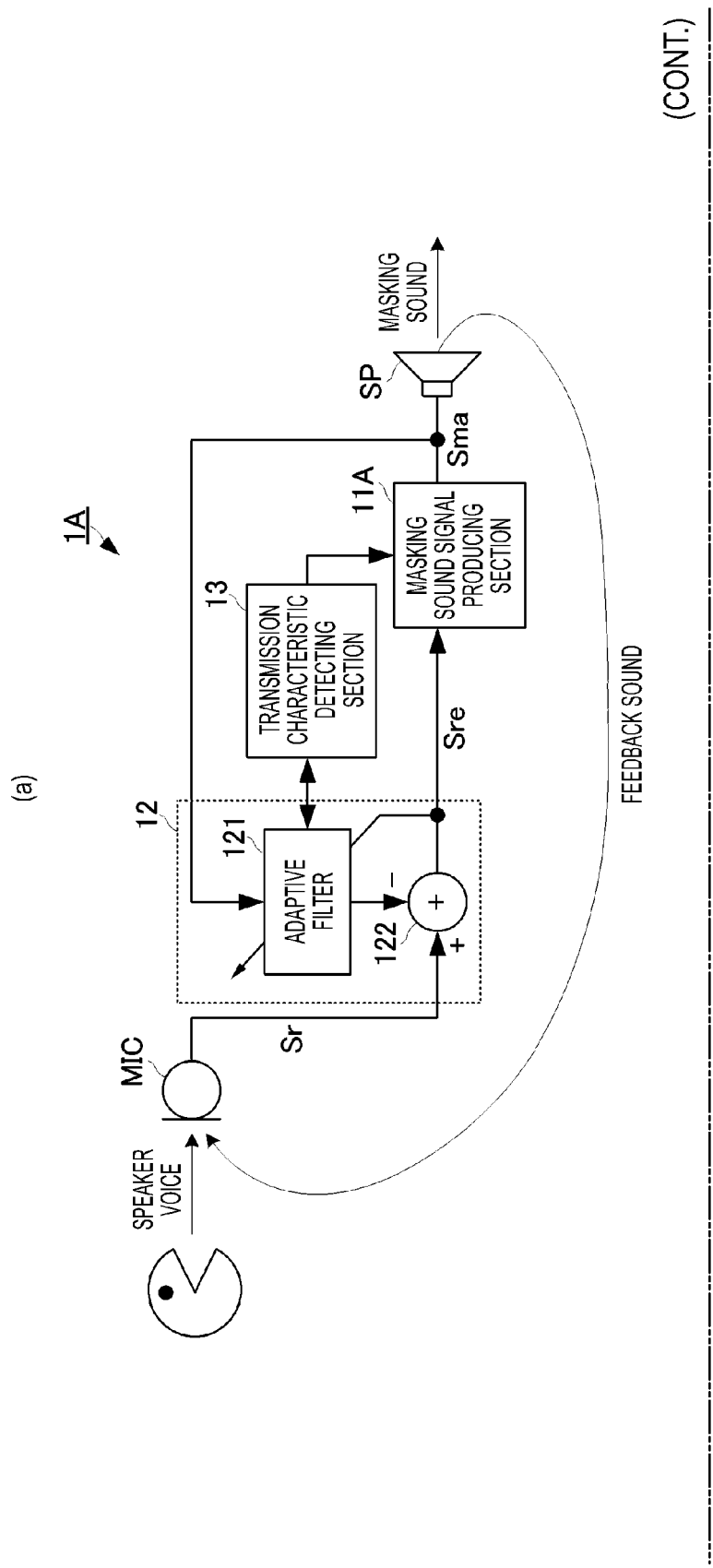

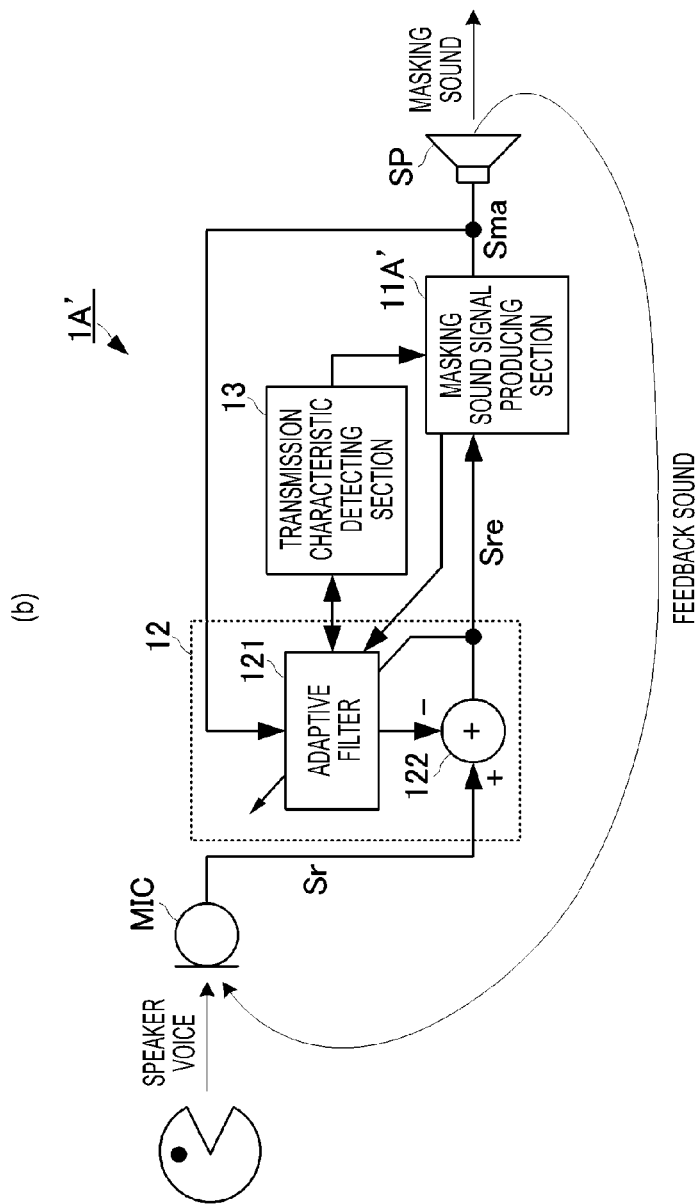
(FIG. 3 CONTINUED)

SOUND MASKING DEVICE AND SOUND MASKING METHOD

This application is a U. S. National Phase Application of PCT International Application PCT/JP2011/070497 filed on Sep. 8, 2011, which is based on and claims priority from JP 2010-200468 filed on Sep. 8, 2010, and JP 2011-057384 filed on Mar. 16, 2011, the contents of which is incorporated in its entirety by reference.

TECHNICAL FIELD

The present invention relates to a sound masking device which produces a masking sound for making a voice uttered by a specific person to be hardly heard by another person in the periphery, and also to a sound masking method.

BACKGROUND ART

Conventionally, various devices for producing a masking sound based on an input sound to make the sound from which the input sound originates, difficult to be hardly heard, such as a sound masking device have been proposed. In the device of Patent Document 1, for example, an environmental sound is input to a sound inputting section, and an environmental sound signal indicating the waveform of the environmental sound is analyzed. Based on a result of the analysis, the device of Patent Document 1 produces a specific generated sound signal. In this case, the device of Patent Document 1 produces the generated sound signal so that a person hears the environmental sound and a generated sound output from the device as a mixed sound (sound which is not uncomfortable) of a specific mode.

PRIOR ART REFERENCE

Patent Document

Patent Document 1: JP-A-2009-118062

SUMMARY OF THE INVENTION

Problems to be Solved by the Invention

In the device disclosed in Patent Document 1, if the device is not placed in an infinite open space, the generated sound feedbacks to the sound inputting section, and the input sound contains an echo of the generated sound. In the case where such a device is used in a sound masking process, therefore, an echo of the masking sound is input together with the voice of a specific person to the sound inputting section. In a conventional device, consequently, a mixed sound of the voice of a specific person with an echo sound is subjected to a waveform analysis, and hence there is a case where a masking sound cannot be produced based only on the voice of the specific person.

It is an object of the invention to provide a sound masking device and sound masking method which can produce a masking sound while suppressing an influence of a sound other than a sound to be masked.

Means for Solving the Problems

The sound masking device which can solve the problem includes: a sound pick-up unit configured to picks up a sound, and produce a picked-up sound signal based on the sound; a masking sound signal producing unit configured to produce a masking sound signal from the picked-up sound signal, the masking sound signal causing the sound picked up by the sound pick-up unit to be hardly hearable by a third person; a sound emitting unit configured to emit a masking sound based on the masking sound signal; and an echo cancelling unit configured to perform an echo cancelling process on the picked-up sound signal by performing an adaptive filtering process on the masking sound signal and by subtracting the filtered masking sound signal from the picked-up sound signal, and in the masking sound signal producing unit, a masking sound signal having a level corresponding to an amplitude level of the picked-up sound signal which has subjected to the echo cancelling process is produced.

Preferably, the sound masking device further includes a transmission characteristic detecting unit configured to acquire transmission characteristics to be used in the filtering process in the echo cancelling unit, and which outputs frequency characteristics of the transmission characteristics, and the masking sound signal producing unit produces the masking sound signal having a frequency feature provided in the frequency characteristics of the transmission characteristics.

Preferably, the masking sound signal producing unit outputs an adjustment content of the masking sound signal which is based on the frequency characteristics of the transmission characteristics, to the echo cancelling unit, and the echo cancelling unit uses the adjustment content in estimation of the transmission characteristics to be used in the filtering process.

Preferably, the sound masking device further includes a sudden-sound detecting unit configured to detect a sudden sound contained in the picked-up sound signal which has subjected to the echo cancelling process, the sudden sound consisting of a characteristic sound in which a sound generation time is shorter than a reference threshold, and, when the sudden sound is detected, the masking sound signal producing unit produces the masking sound signal having a level corresponding to the amplitude level of the picked-up sound signal which has subjected to the echo cancelling process, at a timing outside a period including the sudden sound.

To solve the problem, there is provided a sound masking method which includes: a sound pick-up step of picking up a sound, and producing a picked-up sound signal based on the sound; a masking sound signal producing step of producing a masking sound signal from the picked-up sound signal, the masking sound signal causing the sound picked up in the sound pick-up step to be hardly hearable by a third person; a masking sound outputting step of outputting a masking sound based on the masking sound signal; and an echo cancelling step of performing an echo cancelling process on the picked-up sound signal by performing an adaptive filtering process on the masking sound signal and by subtracting the filtered masking sound signal, from the picked-up sound signal, and in the masking sound signal producing step, a masking sound having a level corresponding to an amplitude level of the picked-up sound signal which has subjected to the echo cancelling process is produced.

Preferably, the sound masking method further includes a transmission characteristic detecting step of acquiring transmission characteristics to be used in the filtering process in the echo cancelling step, and outputting frequency characteristics of the transmission characteristics, and in the masking sound signal producing step, the masking sound signal having a frequency feature provided in the frequency characteristics of the transmission characteristics is produced.

Preferably, in the masking sound signal producing step, an adjustment content of the masking sound signal which is based on the frequency characteristics of the transmission characteristics is output, and, in the echo cancelling step, the adjustment content is used in estimation of the transmission characteristics to be used in the filtering process.

Preferably, the sound masking method further includes a sudden-sound detecting step of detecting a sudden sound contained in the picked-up sound signal which has subjected to the echo cancelling process, the sudden sound consisting of a characteristic sound in which a sound generation time is shorter than a reference threshold, and, when the sudden sound is detected, the masking sound signal producing step produces the masking sound signal having a level corresponding to the amplitude level of the picked-up sound signal which has subjected to the echo cancelling process at a timing outside a period including the sudden sound.

To solve the problem, there is provided a sound masking device which includes: a receiving unit configured to receive a picked-up sound signal; a masking sound signal producing unit configured to produce a masking sound signal from the picked-up sound signal, the masking sound signal causing a sound from which the picked-up sound signal originates, to be hardly hearable by a third person; an outputting unit configured to output the masking sound signal; and an echo cancelling unit configured to perform an echo cancelling process on the picked-up sound signal by performing an adaptive filtering process on the masking sound signal and by subtracting the filtered masking sound signal from the picked-up sound signal, and the masking sound signal producing unit produces a masking sound signal having a level corresponding to an amplitude level of the picked-up sound signal which has subjected to the echo cancelling process.

Effects of the Invention

According to the invention, a masking sound can be produced while suppressing an influence of a sound other than a sound to be masked. Therefore, it is possible to produce a masking sound which is in accordance with a sound to be masked, and which is more adequate.

BRIEF DESCRIPTION OF THE DRAWINGS

In FIGS. 3(a) and 3(b) are block diagrams showing the configuration of a sound masking device of a second embodiment.

MODE FOR CARRYING OUT THE INVENTION

Figure 1:
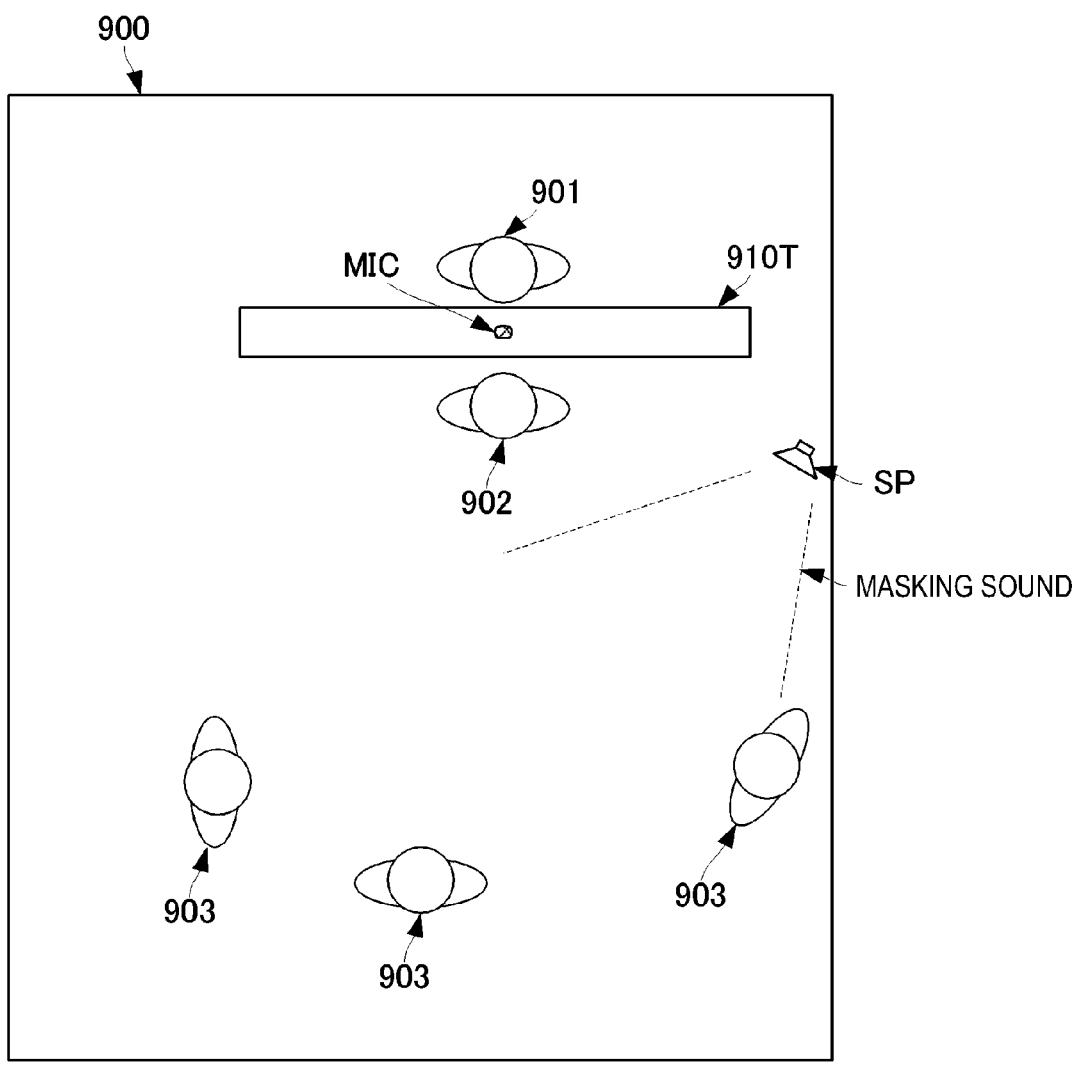
FIG. 1 is a view showing an installation example of a sound masking device of a first embodiment.
Figure 2:
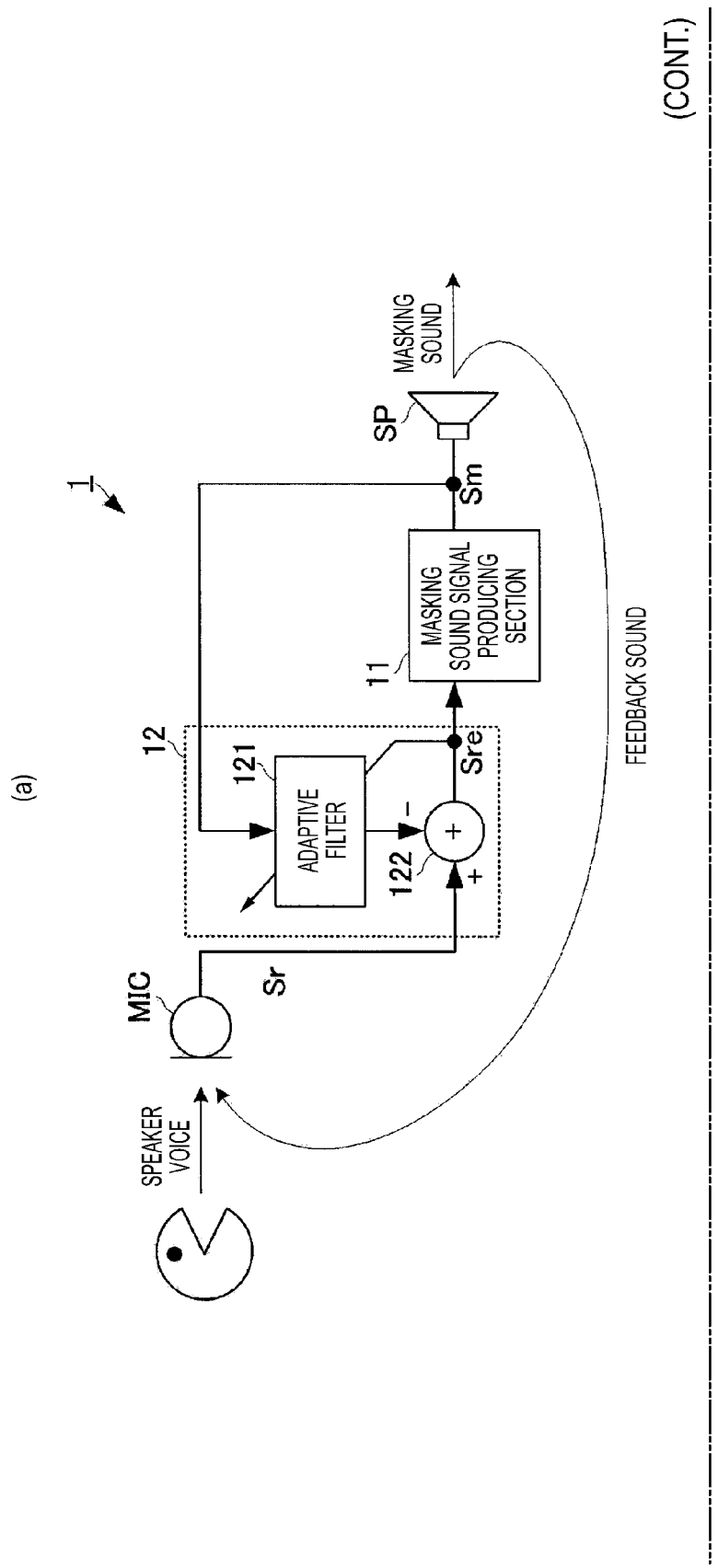
In FIGS. 2(a) and 2(b) are block diagrams showing the configuration of the sound masking device of the first embodiment.

A sound masking device according to a first embodiment of the invention will be described with reference to the figures. FIG. 1 is a view showing an installation example of the sound masking device 1 of the embodiment. FIGS. 2(a) and 2(b) are block diagrams showing the configuration of the sound masking device 1 of the embodiment.

The sound masking device 1 of this embodiment is installed in an environment such as shown in FIG. 1. FIG. 1 shows a case where conversations performed across a counter in a pharmacy are masked, as a specific example. Although only a microphone MIC and loudspeaker SP of the sound masking device 1 are illustrated in FIG. 1, other components of the sound masking device 1 may be placed in a predetermined position of the room, another room, or the like. The microphone MIC and the loudspeaker SP may be integrated with or separated from the sound masking device 1. Alternatively, only one of the microphone MIC and the loudspeaker SP may be integrated with the sound masking device 1.

FIG. 2(a) is a block diagram showing the configuration of the sound masking device 1 including the microphone MIC and the loudspeaker SP. In the case where, as shown in FIG. 2(b), the microphone MIC and the loudspeaker SP are disposed separately from a sound masking device 1', a receiving section (receiving unit) which receives a picked-up sound signal from the microphone MIC, and an outputting section (outputting unit) which outputs a masking sound signal to the loudspeaker SP are disposed in the sound masking device 1'.

A counter 910T is disposed in a room 900, and a clerk 901 such as a pharmacist and a customer 902 have a conversation with each other while facing each other across the counter 910T. A sound (voice sound) generated by the clerk 901, and a sound (voice sound) generated by the customer 902 are the sounds to be masked in the embodiment. The microphone MIC (corresponding to "sound pick-up unit" in the invention) which is a component of the sound masking device 1 is disposed on the counter 910T.

Moreover, a store shelf and the like which are not shown are disposed in the room 900, and third persons 903 exist in an area where the store shelf and the like are disposed. The loudspeaker SP (corresponding to "sound emitting unit" in the invention) is disposed so as to emit a sound toward the area where the third persons 903 exist. Based on the picked-up sound signal from the microphone MIC, the sound masking device 1 emits a masking sound from the loudspeaker SP so that the third persons 903 hardly understand the content of a conversation between the clerk 901 and the customer 902, and namely the sounds generated by the clerk 901 and the customer 902 are hardly heard by the third persons 903.

As shown in FIG. 2(a), the sound masking device 1 which produces a masking sound includes the microphone MIC, the loudspeaker SP, a masking sound signal producing section 11, and an echo cancelling section 12.

The loudspeaker SP converts a masking sound signal Sm which is produced by the process described later, to a masking sound, and emits the masking sound.

The microphone MIC picks up the ambient sound containing sounds (hereinafter, referred to as "specific person voice") generated by the clerk 901 and the customer 902, and outputs a picked-up sound signal Sr to the echo cancelling section 12. The picked-up sound signal Sr contains also a feedback sound of the masking sound emitted from the loudspeaker SP (hereinafter, referred to simply as "feedback sound") in addition to the specific person voice.

The echo cancelling section 12 includes an adaptive filter 121 and a postprocessor 122. The adaptive filter 121 estimates the transmission characteristics of the feedback sound of the masking sound based on an echo-cancelled signal Sre, and determines a filter coefficient according to the estimated transmission characteristics. The adaptive filter 121 performs a filter process on a masking sound signal Sm by using the filter coefficient, thereby producing a pseudo recurrent sound signal which corresponds to the feedback sound of the masking sound. The postprocessor 122 subtracts the pseudo recurrent sound signal from the picked-up sound signal Sr to produce the echo-cancelled signal Sre. The echo cancelling process is consecutively made adaptive so that the feedback sound component contained in the echo-cancelled signal Sre becomes 0 (zero).

Therefore, the echo-cancelled signal Sre after adaption consists of substantially only the specific person voice.

The masking sound signal producing section 11 produces the masking sound signal Sm based on the echo-cancelled signal Sre. The produced masking sound signal Sm is output to the loudspeaker SP, and also to the adaptive filter 121 of the echo cancelling section 12.

Here, the masking sound signal producing section 11 produces the masking sound signal Sm based on the time domain component and component change of the echo-cancelled signal Sre, and the like. Alternatively, the masking sound signal producing section 11 may produce the masking sound signal Sm based on the frequency domain component of the echo-cancelled signal Sre.

Specifically, in the case where the time domain component of the echo-cancelled signal Sre is used, the masking sound signal producing section 11 monitors the amplitude level of the input echo-cancelled signal Sre, and produces the masking sound signal Sm according to the amplitude level. In this case, the masking sound signal Sm is configured by a disturbance sound and a background sound. As the disturbance sound, for example, the sound of a crowd, other arbitrary conversations, or the like is used. As the background sound, for example, the sound of the nature such as a mountain, a river, or the sea is used. The masking sound signal Sm may be produced at an amplitude level at which, when the third persons 903 hear the specific person voice and the masking sound emitted from the loudspeaker SP, the specific person voice is hardly hearable by a third person. Preferably, the amplitude level of the masking sound signal Sm is set so that the masking sound emitted from the loudspeaker SP is louder than the specific person voice.

When the masking sound based on the masking sound signal Sm is emitted, it is possible to make the specific person voice difficult to be hearable by the third persons 903.

In the case where the configuration of the embodiment is employed, even when the feedback sound of the masking sound is picked up by the microphone MIC, the feedback sound components is suppressed by the echo cancelling section 12. Therefore, the echo-cancelled signal Sre which is configured by substantially only the specific person voice is input to the masking sound signal producing section 11. Consequently, the masking sound signal producing section 11 can produce the masking sound signal Sm which depends only on the specific person voice, without being affected by the feedback sound of the masking sound. Therefore, the amplitude level of the masking sound signal Sm is not affected by the feedback sound, and the amplitude level of the masking sound signal Sm can be set in accordance with only the amplitude level of the specific person voice. As a result, even when a masking sound which is higher in level than required is not emitted, the specific person voice can be masked while emitting a masking sound at an adequate volume.

Since the feedback sound is suppressed, the existence of the specific person voice, i.e., the beginning and ending of speaking of the specific person can be definitely distinguished. Therefore, the masking sound signal Sm can be produced and emitted at an adequate amplitude level, only in the case where the specific person voice exists, in other words, during a period when the specific person speaks. In the case where a masking sound is steadily emitted, the masking sound signal Sm can be produced and emitted at a high amplitude level, only during a period when the specific person speaks.

As described above, when the configuration of the embodiment is employed, the conversation of the specific person can be masked practically and efficiently with respect to a third person.

Next, a sound masking device of a second embodiment will be described with reference to the figures. FIGS. 3($a$) and 3($b$) are block diagrams showing the configurations of the sound masking devices 1A, 1A' of the embodiment.

The sound masking device 1A of the embodiment shown in FIG. 3($a$) has a configuration in which a transmission characteristic detecting section 13 is added to the sound masking device 1 shown in the first embodiment. The process of a masking sound signal producing section 11A is different based on the additional configuration. Hereinafter, therefore, only different portions will be specifically described. Similarly with the sound masking device 1' shown in the first embodiment, the microphone MIC and the loudspeaker SP may be disposed separately from the sound masking devices 1A, 1A'.

The transmission characteristic detecting section 13 acquires the transmission characteristics which are estimated by the adaptive filter 121 of the echo cancelling section 12. The transmission characteristic detecting section 13 analyzes the transmission characteristics in the time and frequency domains. For example, the transmission characteristic detecting section 13 analyzes a frequency of long reverberation or the like in the environment where the microphone MIC and the loudspeaker SP are disposed, from the frequency feature of the transmission characteristics. The transmission characteristic detecting section 13 outputs a result of the analysis to the masking sound signal producing section 11A.

The masking sound signal producing section 11A produces a masking sound signal Sma based on the echo-cancelled signal Sre and the analysis result. In this case, for example, the masking sound signal producing section 11A produces the masking sound signal Sma so as to increase the amplitude level of a frequency of long reverberation, based on the echo-cancelled signal Sre, i.e., the specific person voice, and the analysis result as described above.

According to the configuration, a masking sound of long reverberation is emitted from the loudspeaker SP. Therefore, it is further difficult for the third persons 903 to understand the specific person voice. In the embodiment, the example in which a frequency component of long reverberation is emphasized has been described. Alternatively, another sound adjustment may be employed as far as the masking sound signal Sma is produced based on the acquired transmission characteristics so that it is further difficult for the third persons 903 to understand the specific person voice.

As shown in FIG. 3(B), the adjustment content (for example, a frequency at which the amplitude level is increased) of the masking sound may be output from a masking sound signal producing section 11A' to the adaptive filter 121. In the adaptive filter 121, the input adjustment content is used in the estimation of the transmission characteristics. For example, the adaptive filter 121 offsets the initial value in accordance with the adjustment content of the masking sound.

When the adjustment content of the masking sound are given to the adaptive filter 121 in this way, the adaptation of the adaptive filter 121 can be rapidly converged. This enables an adequate masking process according to the specific person voice to be promptly started.

Figure 4:
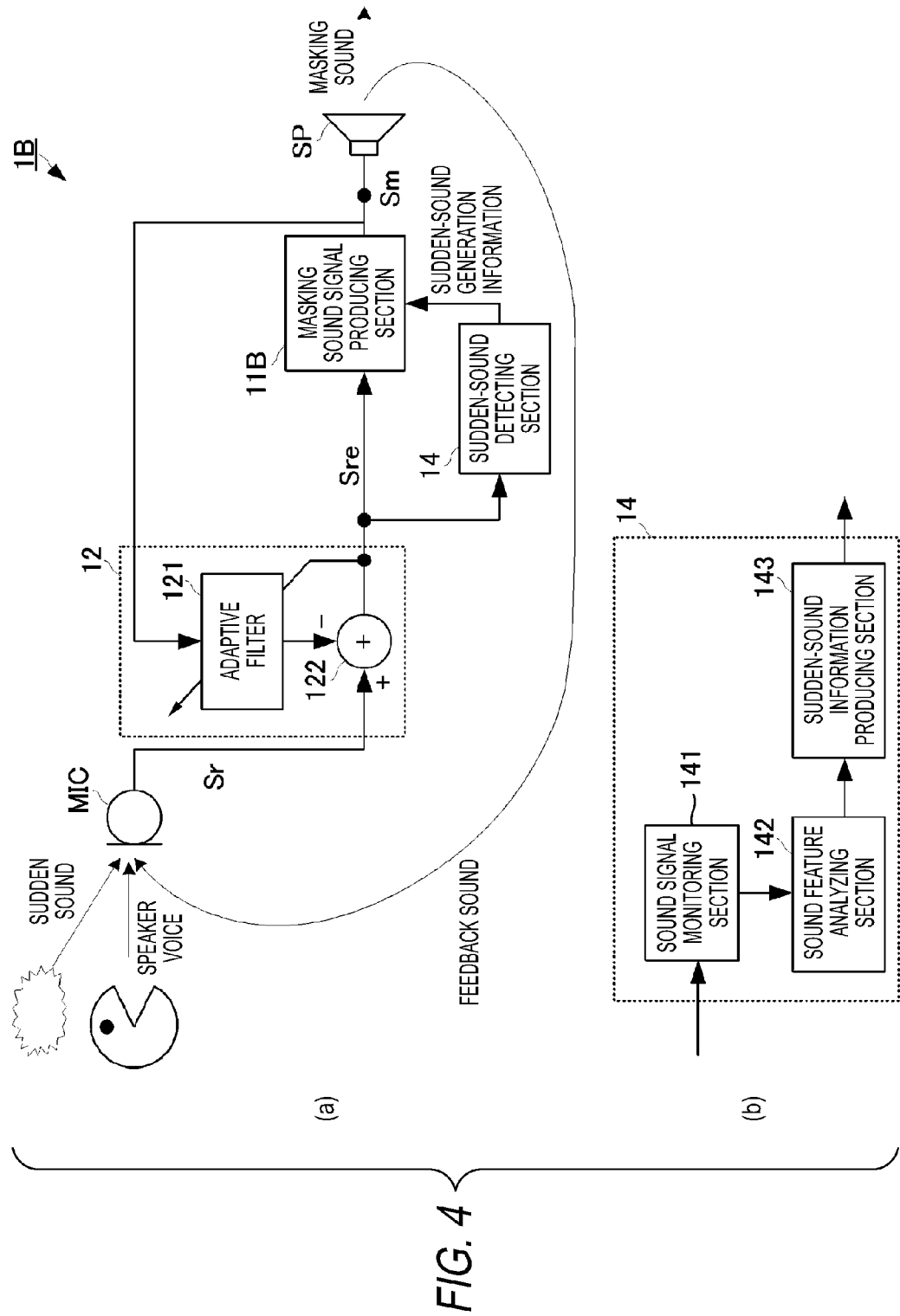
In FIGS. 4(a) and 4(b) are block diagrams showing the configuration of a sound masking device of a third embodiment.

Next, a sound masking device of a third embodiment will be described with reference to the figures. FIGS. 4($a$) and 4($b$) are block diagrams showing the configuration of the sound masking device 1B of the embodiment. FIG. 4($a$) is a diagram showing the whole configuration of the sound masking device 1B, and FIG. 4(b) is a diagram showing the configuration of a sudden-sound detecting section 14.

A sudden sound means a sound which is not correlated in amplitude level and frequency characteristics with the disturbance and background sounds constituting the above-described masking sound signal Sm, and which is generated only a short time period (for example, several seconds).

As shown in FIG. 4(a), the sound masking device 1B of the embodiment has a configuration in which the sudden-sound detecting section 14 is added to the sound masking device 1 shown in the first embodiment. The process of a masking sound signal producing section 11B is different based on the additional configuration. Similarly with the sound masking device 1' shown in the first embodiment, the microphone MIC and the loudspeaker SP may be disposed separately from the sound masking device 1B.

As shown in FIG. 4(b), the sudden-sound detecting section 14 includes a sound signal monitoring section 141, a sound feature analyzing section 142, and a sudden-sound information producing section 143.

The sound signal monitoring section 141 buffers the echo-cancelled signal Sre for a predetermined time length. The sound feature analyzing section 142 analyzes the sound feature of the echo-cancelled signal Sre which is sequentially buffered. Specifically, the sound feature analyzing section 142 analyzes the frequency spectrum, formants, and the like of the echo-cancelled signal Sre, and outputs a result of the analysis to the sudden-sound information producing section 143.

The sudden-sound information producing section 143 sequentially stores results of the analysis, and sequentially detects the similarity of the analysis results on the time axis. When a timing at which the similarity is low is detected, the sudden-sound information producing section 143 determines that a sudden sound is generated at the timing, and outputs sudden-sound generation information to the masking sound signal producing section 11B.

Upon reception of the sudden-sound generation information, without using the echo-cancelled signal Sre at the timing, the masking sound signal producing section 11B produces the masking sound signal Sm in accordance with the amplitude level or the like which is set at a predetermined timing that precedes the timing.

According to the configuration, even when the microphone MIC picks up a sudden sound which is different from the specific person voice, together with the specific person voice, an optimum masking sound according to the specific person voice can be emitted without being affected by the sudden sound.

In the sound masking device 1B shown in the embodiment, a sudden sound is detected from the echo-cancelled signal Sre. Alternatively, the picked-up sound signal Sr may be monitored, and a sudden sound may be detected from a change of the sound feature of the picked-up sound signal Sr.

According to the configuration, however, the echo-cancelled signal Sre in which a feedback sound of the masking sound is suppressed by the echo cancelling process is used. At a timing when a sudden sound is picked up, therefore, the echo-cancelled signal Sre contains only the specific person voice and the sudden sound. As compared with the case where a feedback sound is contained, consequently, sound features of the specific person voice and the sudden sound can be more easily detected, and a sudden sound can be more surely detected.

In the above-described embodiments, the case where one microphone MIC and one loudspeaker SP are used has been exemplarily described. The above-described configuration and process concept can be applied also to the case where at least one of the microphone MIC and the loudspeaker SP is disposed in a plural number.

Figure 5:
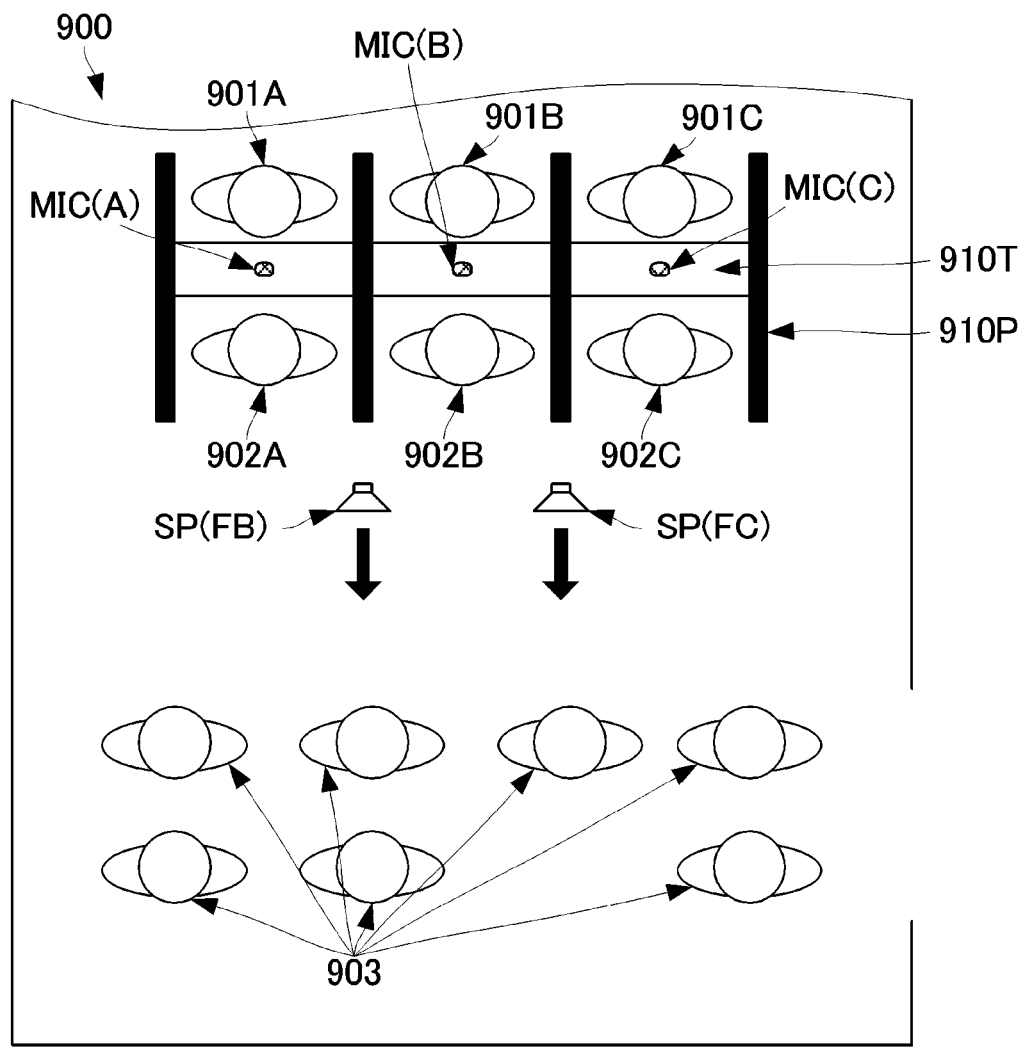
FIG. 5 shows an installation example of a sound masking device in an environment which is partitioned by partitions into three booths.

For example, FIG. 5 shows an installation example of a sound masking device in an environment in which three microphone MIC(A), MIC(B), MIC(C), and two loudspeakers SP(FB), SP(FC) are placed, and which is partitioned by partitions 910P into three booths. Even in this case, the above-described configuration and process may be applied to each combination of one microphone and one loudspeaker.

Hereinafter, a summary of the invention will be described in detail.

The invention relates to a sound masking device. The sound masking device includes a sound pick-up unit, a masking sound signal producing unit, a sound emitting unit, and an echo cancelling unit. The sound pick-up unit picks up a sound, and produces a picked-up sound signal based on the sound. The echo cancelling unit performs an adaptive filtering process on a masking sound signal, and a process of subtracting the masking sound signal which has subjected to the filtering process, from the picked-up sound signal, thereby performing an echo cancelling process on the picked-up sound signal. The masking sound signal producing unit produces a masking sound signal having a level corresponding to the amplitude level of the picked-up sound signal which has subjected to the echo cancelling process. The sound emitting unit emits a masking sound based on the masking sound signal.

According to the configuration, even when the masking sound wraps around and is then picked up by the sound pick-up unit, the feedback sound is suppressed by the echo cancelling unit. Therefore, a sound signal in which the feedback sound is suppressed is input to the masking sound signal producing unit. Specifically, for example, only the voice of the specific person to be masked is input. This causes a masking sound to be produced based only on the sound signal to be masked.

The sound masking device of the invention includes a transmission characteristic detecting unit which acquires transmission characteristics to be used in the filtering process in the echo cancelling unit, and which outputs frequency characteristics of the transmission characteristics. The masking sound signal producing unit produces a masking sound signal having a frequency feature provided in the frequency characteristics of the transmission characteristics.

According to the configuration, a masking sound including also the frequency characteristics of the transmission characteristics can be produced. Therefore, it is possible to produce a masking sound according to the picked-up sound environment. In the environment (in a room) where the specific person exists, or the like, for example, a masking sound or the like which more easily reverberates can be produced.

The sound masking device of the invention includes a sudden-sound detecting unit which detects a sudden sound contained in the picked-up sound signal which has subjected to the echo cancelling process, the sudden sound consisting of a characteristic sound in which a sound generation time is shorter than a reference threshold. When the sudden sound is detected, the masking sound signal producing unit produces the masking sound signal having a level corresponding to the amplitude level of the picked-up sound signal which has subjected to the echo cancelling process, at a timing when a sudden sound is not detected (timing outside a period including the sudden sound).

According to the configuration, a masking sound including also a result of the detection of a sudden sound can be produced. Therefore, in the case where a sudden sound which is different from the specific person voice to be masked is detected, for example, the sudden sound is not used in production of a masking sound.

The above-described embodiments merely illustrate typical forms of the invention, and the invention is not limited to the embodiments. Namely, the invention may be performed with various modifications without departing from the spirit of the invention.

The application is based on Japanese Patent Application (No. 2010-200468) filed Sep. 8, 2010 and Japanese Patent Application (No. 2011-057384) filed Mar. 16, 2011, and the contents of which are incorporated herein by reference.

INDUSTRIAL APPLICABILITY

It is possible to provide a sound masking device and sound masking method which can produce a masking sound while suppressing an influence of a sound other than a sound to be masked.

DESCRIPTION OF REFERENCE NUMERALS AND SIGNS 1, 1A, 1B sound masking device
11, 11A, 11A', 11B masking sound signal producing section
12 echo cancelling section
121 adaptive filter
122 postprocessor
13 transmission characteristic detecting section
14 sudden-sound detecting section
141 sound signal monitoring section
142 sound feature analyzing section
143 sudden-sound information producing section
MIC, MIC(A), MIC(B), MIC(C) microphone
SP, SP(FB), SP(FC) loudspeaker
900 room
901, 901A, 901B, 901C clerk
902, 902A, 902B, 902C customer
903 third person
910T counter
910P partition

The invention claimed is:

1. A sound masking device comprising:
a sound pick-up unit configured to pick up a sound, and produce a picked-up sound signal based on the sound;
a masking sound signal producing unit configured to produce a masking sound signal from the picked-up sound signal, the masking sound signal causing the sound picked up by the sound pick-up unit to be hardly hearable by a third person;
a sound emitting unit configured to emit a masking sound based on the masking sound signal; and
an echo cancelling unit configured to perform an echo cancelling process on the picked-up sound signal by performing an adaptive filtering process on the masking sound signal and by subtracting the filtered masking sound signal from the picked-up sound signal,
wherein the produced masking sound signal has a level corresponding to an amplitude level of the picked-up sound signal that has been subjected to the echo cancelling process.

2. The sound masking device according to claim 1, further comprising:
a transmission characteristic detecting unit configured to acquire transmission characteristics to be used in the filtering process in the echo cancelling unit, and output frequency characteristics of the transmission characteristics, and
wherein the produced masking sound signal has a frequency feature provided in the frequency characteristics of the transmission characteristics.

3. The sound masking device according to claim 2, wherein:
the masking sound signal producing unit outputs an adjustment content of the masking sound signal based on the frequency characteristics of the transmission characteristics, to the echo cancelling unit, and
the echo cancelling unit uses the adjustment content to estimate the transmission characteristics to be used in the filtering process.

4. The sound masking device according to claim 3, further comprising:
a sudden-sound detecting unit configured to detect a sudden sound contained in the picked-up sound signal that has subjected to the echo cancelling process, the sudden sound consisting of a characteristic sound in which a sound generation time is shorter than a reference threshold, and
wherein upon the sudden-sound detecting unit detecting the sudden sound, the masking sound signal producing unit produces the masking sound signal, at a timing outside a period including the sudden sound.

5. The sound masking device according to claim 2, further comprising:
a sudden-sound detecting unit configured to detect a sudden sound contained in the picked-up sound signal that has subjected to the echo cancelling process, the sudden sound consisting of a characteristic sound in which a sound generation time is shorter than a reference threshold, and
wherein upon the sudden-sound detecting unit detecting the sudden sound, the masking sound signal producing unit produces the masking sound signal, at a timing outside a period including the sudden sound.

6. The sound masking device according to claim 1, further comprising:
a sudden-sound detecting unit configured to detect a sudden sound contained in the picked-up sound signal that has been subjected to the echo cancelling process, the sudden sound consisting of a characteristic sound in which a sound generation time is shorter than a reference threshold, and
wherein upon the sudden-sound detecting unit detecting the sudden sound, the masking sound signal producing unit produces the masking sound signal, at a timing outside a period including the sudden sound.

7. A method of masking sound using a sound masking device comprising:
a sound pick-up unit configured to pick up a sound, and produce a picked-up sound signal based on the sound;
a masking sound signal producing unit configured to produce a masking sound signal from the picked-up sound signal, the masking sound signal causing the sound picked up by the sound pick-up unit to be hardly hearable by a third person;
a sound emitting unit configured to emit a masking sound based on the masking sound signal; and
an echo cancelling unit configured to perform an echo cancelling process on the picked-up sound signal by performing an adaptive filtering process on the masking sound signal and by subtracting the filtered masking sound signal from the picked-up sound signal, wherein the method comprises:
- a sound pick-up step of picking up the sound and producing a picked-up sound signal based on the sound using the sound pick-up unit;
- a masking sound signal producing step of producing the masking sound signal from the picked-up sound signal using the masking sound signal producing unit;
- a masking sound outputting step of outputting the masking sound based on the masking sound signal using the sound emitting unit; and
- an echo cancelling step of performing the echo cancelling process on the picked-up sound signal using the echo cancelling unit,
- wherein the produced masking sound has a level corresponding to an amplitude level of the picked-up sound signal that has been subjected to the echo cancelling process.

8. The sound masking method according to claim 7, further comprising:
- a transmission characteristic detecting step of acquiring transmission characteristics to be used in the filtering process in the echo cancelling step, and outputting frequency characteristics of the transmission characteristics, and
- wherein the produced masking sound signal has a frequency feature provided in the frequency characteristics of the transmission characteristics.

9. The sound masking method according to claim 8, wherein:
- the masking sound signal producing step outputs an adjustment content of the masking sound signal based on the frequency characteristics of the transmission characteristics, and
- the echo cancelling step uses the adjustment content to estimate the transmission characteristics to be used in the filtering process.

10. The sound masking method according to claim 8, further comprising:
- a sudden-sound detecting unit configured to detect a sudden sound contained in the picked-up sound signal that has subjected to the echo cancelling process, the sudden sound consisting of a characteristic sound in which a sound generation time is shorter than a reference threshold, and
- wherein upon the sudden-sound detecting unit detecting the sudden sound, the masking sound signal producing unit produces the masking sound signal, at a timing outside a period including the sudden sound.

11. The sound masking method according to claim 9, further comprising:
- a sudden-sound detecting step of detecting a sudden sound contained in the picked-up sound signal that has subjected to the echo cancelling process, the sudden sound consisting of a characteristic sound in which a sound generation time is shorter than a reference threshold; and
- wherein upon the sudden-sound detecting step detecting the sudden sound, the masking sound signal producing step produces the masking sound signal, at a timing outside a period including the sudden sound.

12. The sound masking method according to claim 7, further comprising:
- a sudden-sound detecting step of detecting a sudden sound contained in the picked-up sound signal that has been subjected to the echo cancelling process, the sudden sound consisting of a characteristic sound in which a sound generation time is shorter than a reference threshold,
- wherein upon the sudden-sound detecting step detecting the sudden sound, the masking sound signal producing step produces the masking sound signal, at a timing outside a period including the sudden sound.

13. A sound masking device comprising:
- a receiving unit configured to receive a picked-up sound signal;
- a masking sound signal producing unit configured to produce a masking sound signal from the picked-up sound signal, the masking sound signal causing a sound from which the picked-up sound signal originates, to be hardly hearable by a third person;
- an outputting unit configured to which output the masking sound signal; and
- an echo cancelling unit configured to perform an echo cancelling process on the picked-up sound signal by performing an adaptive filtering process on the masking sound signal and by subtracting the filtered masking sound signal from the picked-up sound signal,
- wherein the produced masking sound signal has a level corresponding to an amplitude level of the picked-up sound signal that has been subjected to the echo cancelling process.

* * * * *